United States Patent
Galmiche et al.

(10) Patent No.: US 10,998,794 B2
(45) Date of Patent: May 4, 2021

(54) ROTATING ELECTRICAL MACHINE COMPRISING ASYMMETRICAL HEAT EXCHANGE PINS

(71) Applicant: GE ENERGY POWER CONVERSION TECHNOLOGY LIMITED, Rugby (GB)

(72) Inventors: Christophe Galmiche, Champigneulles (FR); Fabien Roche, Champigneulles (FR)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 235 days.

(21) Appl. No.: 16/026,204

(22) Filed: Jul. 3, 2018

(65) Prior Publication Data
US 2019/0074755 A1   Mar. 7, 2019

(30) Foreign Application Priority Data

Jul. 3, 2017 (EP) ..................... 17305855

(51) Int. Cl.
*H02K 9/04* (2006.01)
*H02K 1/32* (2006.01)
*H02K 1/20* (2006.01)
*H02K 3/28* (2006.01)
*H02K 21/12* (2006.01)

(52) U.S. Cl.
CPC ............... *H02K 9/04* (2013.01); *H02K 1/20* (2013.01); *H02K 1/32* (2013.01); *H02K 3/28* (2013.01); *H02K 21/12* (2013.01); *H02K 2213/03* (2013.01)

(58) Field of Classification Search
CPC ............ H02K 1/20; H02K 1/32; H02K 1/325; H02K 3/04; H02K 3/12; H02K 3/24; H02K 3/28; H02K 9/00; H02K 9/005; H02K 9/02; H02K 9/04; H02K 2213/03
See application file for complete search history.

(56) References Cited

U.S. PATENT DOCUMENTS

| 7,175,386 B2 | 2/2007 | Cherolis et al. |
| 2002/0084703 A1 | 7/2002 | Bunker et al. |
| 2003/0048030 A1 | 3/2003 | Griffith et al. |

FOREIGN PATENT DOCUMENTS

| EP | 0 951 130 A2 | 10/1999 |
| GB | 2419475 A | 4/2006 |
| WO | 01/17094 A1 | 3/2001 |
| WO | 03/012955 A1 | 2/2003 |

OTHER PUBLICATIONS

Extended European Search Report and Opinion issued in connection with corresponding EP Application No. 17305855.3 dated Oct. 16, 2017.

*Primary Examiner* — Alex Torres-Rivera
*Assistant Examiner* — David A. Singh
(74) *Attorney, Agent, or Firm* — Wood IP LLC

(57) ABSTRACT

Element of a rotating electrical machine, of the rotor or stator type, comprising a plurality of stacks of magnetic sheets each equipped with a tooth comprising notches intended to accommodate electrical windings, and pins arranged between two successive bundles of sheets forming an air-flow duct. A portion of the pins is distributed asymmetrically on the tooth of the stator or rotor sheet with respect to a median axis of the width of the tooth.

20 Claims, 3 Drawing Sheets

ROTATING ELECTRICAL MACHINE COMPRISING ASYMMETRICAL HEAT EXCHANGE PINS

FIELD OF THE INVENTION

Embodiments of the present invention relates to an air-flow duct for a rotor and a stator of an electrical machine. The embodiments of the present invention also relates to a rotating electrical machine comprising such a cooling duct and a method for manufacturing such a cooling duct.

BACKGROUND

The stator and/or the rotor of a rotating electrical machine may comprise a stack of magnetic sheets of substantially circular shape held together by tie rods or bars. The tie rods or bars compact and hold the magnetic sheets. The stator magnetic sheets have a recess in their center. The rotor sheets are circular in shape and include a recess in their center.

During the operation of a rotating electrical machine, in motor mode or generator mode, it dissipates a portion of the energy received in the form of heat generated by the iron losses and Joule losses of the rotor and the stator. This heat generation increases the temperature of the rotor-stator assembly and degrades the efficiency of the rotating electrical machine.

To maintain the performance of the rotating electrical machine, it is necessary to cool the rotor-stator assembly.

For the purpose of cooling the rotor-stator assembly, one solution consists of inserting spacers between the magnetic sheet bundles forming the rotor and/or the stator of the rotating electrical machine, in order to delimit an air-flow duct in the rotor and/or the stator. The spacers are distributed in the sheets such that the rigidity of the rotor or the stator is not compromised. Each spacer bears a load of approximately 130 kg. This load depends on the compaction pressure of the magnetic sheets and the section of the spacer.

FIG. 1 shows a configuration of circular spacers arranged on the tooth of a stator magnetic sheet according to the state of the art. The circular spacers 1 are hereinafter referred to as pins. A stator magnetic sheet has a yoke 2 and a plurality of teeth 3 located on the inner periphery of the sheet.

FIG. 2 also shows a configuration of circular spacers 1 arranged on the tooth of a rotor magnetic sheet according to the state of the art. A rotor magnetic sheet has a yoke 4 and a plurality of teeth 5 located on the inner periphery of the sheet.

According to the width of the tooth and so as not to perforate the magnetic sheets in contact with the at least one pin 1, a plurality of pins 1 are arranged in a circle shown by dotted lines whose center is on the axis of rotation of the rotor of the rotating electrical machine and the radius is equal to the distance separating the center of the circle and the center of a pin.

In this regard, reference may be made to documents U.S. Pat. Nos. 4,515,523, 7,175,386, 3,360,725, US 2014/0064983 and US 2015/0093252 which describe spacers for gas and steam turbines for the improvement of heat exchanges.

However, the devices described in these documents are not transferable to a rotating electrical machine.

Reference may be made to document U.S. Pat. No. 6,583,526, which describes the placement of pins on the teeth of a rotor sheet. The pins are distributed such that three pins form a triangle or such that the pins are offset with respect to one another.

Reference may also be made to document U.S. Pat. No. 6,815,848, which describes the placement of pins on the teeth of a rotor sheet.

However, the pins are arranged on the teeth of the magnetic sheets such that, on each tooth, at least two pins are aligned in a circle whose center is on the axis of rotation of the rotor of the rotating electrical machine and the radius is equal to the distance separating the center of the circle and the center of a pin.

When the air flow passes through the air-flow duct, the pins located in a circle of the same diameter obstruct the air-flow duct.

As a result, the heat exchanges are degraded.

It is therefore proposed to overcome the disadvantages associated with the arrangement of the pins according to the state of the art.

BRIEF SUMMARY

In view of the foregoing, the embodiment of the present invention proposes, in one aspect, an element of a rotating electrical machine of the rotor or stator type comprising a plurality of stacks of magnetic sheets each equipped with a tooth comprising notches intended to accommodate electrical windings, and pins arranged between two successive bundles of sheets forming an air-flow duct.

According to a general characteristic of this element of a rotating electrical machine, a portion of the pins is distributed asymmetrically on the tooth of the stator or rotor sheet with respect to a median axis of the width of the tooth.

In an embodiment, this element of a rotating electrical machine constitutes a rotor or a stator of the rotating electrical machine.

According to another characteristic, the circumferential distance between the centers of two adjacent pins projected along an axis defined by the width of the tooth is between $4/10$ and $8/10$, and more particularly between $1/2$ and $6/10$, of the width of the tooth.

According to yet another characteristic, the radial distance between the centers of two adjacent pins is between $1/10$ and $3/2$, and more particularly between $1/3$ and $9/10$, of the circumferential distance between the centers of two adjacent pins projected along an axis defined by the width of the tooth.

In an embodiment, the section of the pin is triangular, square, hexagonal, or more particularly round.

In one embodiment, the pin is in the form of a cylinder, a cone, a barrel or a diabolo, and more particularly in the form of a cylinder.

According to yet another characteristic, the pins are made of metallic material, more particularly steel.

In an embodiment, each pin is fixed to the tooth by gluing, brazing, welding, molding, or obtained by stamping, more particularly by welding.

According to another characteristic, the section of the pin is in a square with an edge of 1 to 10 mm, and more particularly 3 mm.

According to yet another characteristic, the length of the pin is between 2 and 20 mm, and more particularly between 5 and 10 mm, and more particularly 5 mm.

According to another aspect, a rotating electrical machine is provided comprising a rotor and a stator, whereby at least one of said rotor and stator comprises a plurality of stacks of magnetic sheets each having a tooth comprising notches intended to accommodate electrical windings, and pins arranged between two successive bundles of sheets forming an air-flow duct.

In an embodiment, a portion of the pins is distributed asymmetrically on the tooth of the stator or rotor sheet with respect to a median axis of the width of the tooth.

According to one aspect, a method is provided for producing a tooth of a magnetic sheet of a rotor or stator.

According to a general characteristic of this method, it comprises at least one step in which pins are arranged asymmetrically on the tooth with respect to a median axis of the width of the tooth.

BRIEF DESCRIPTION OF THE DRAWINGS

Other characteristics and advantages of the embodiment will become apparent on reading the following description of the embodiments of the invention, given solely by way of nonlimiting examples, with reference to the drawings, in which.

DETAILED DESCRIPTION

This description relates, in a manner that is in no way limiting, to an embodiment of a rotating electrical machine comprising stacks of stator magnetic sheets included in the stator of the rotating electrical machine. Of course, it is not beyond the scope of the embodiments of the present invention for the rotor to be made from such stacks or for the rotating electrical machine to have a stator or a rotor, or a rotor and a stator made from such stacks.

Figure 1:
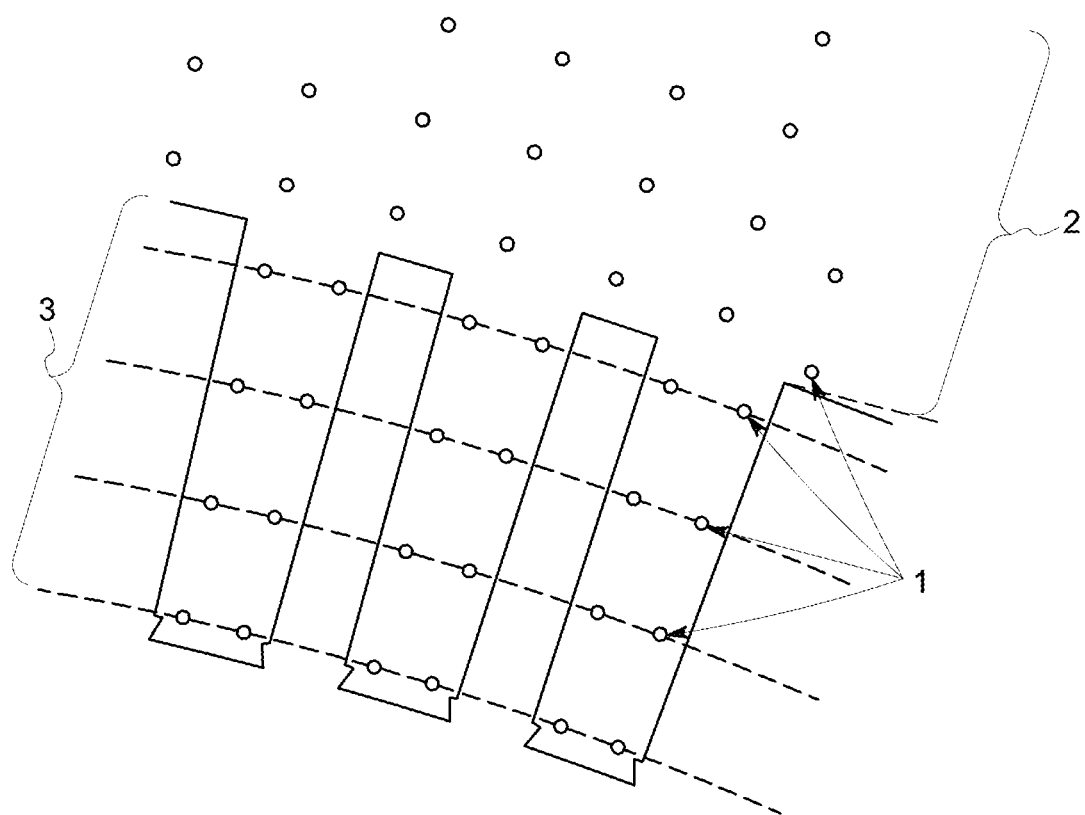
FIGS. 1 and 2, which have already been mentioned, illustrate the arrangement of pins arranged on the tooth of a stator and rotor magnetic sheet according to the state of the art.
Figure 2:
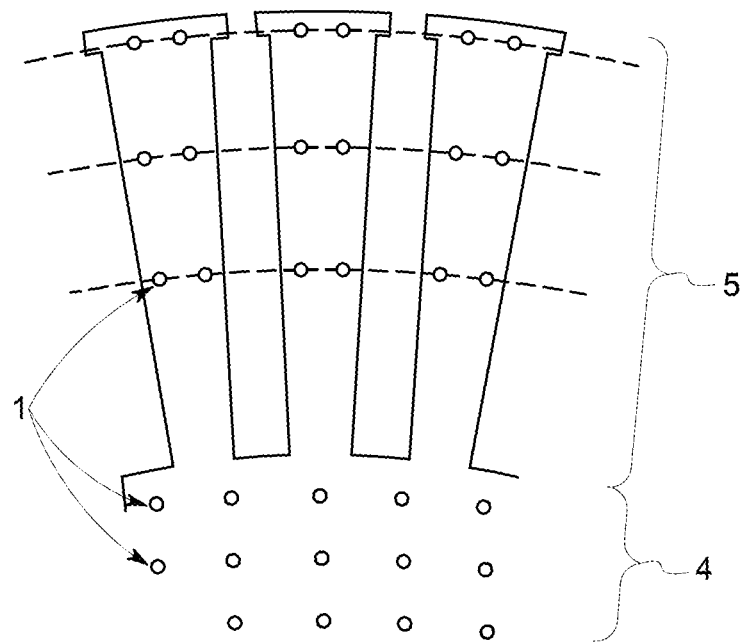
Figure 3:
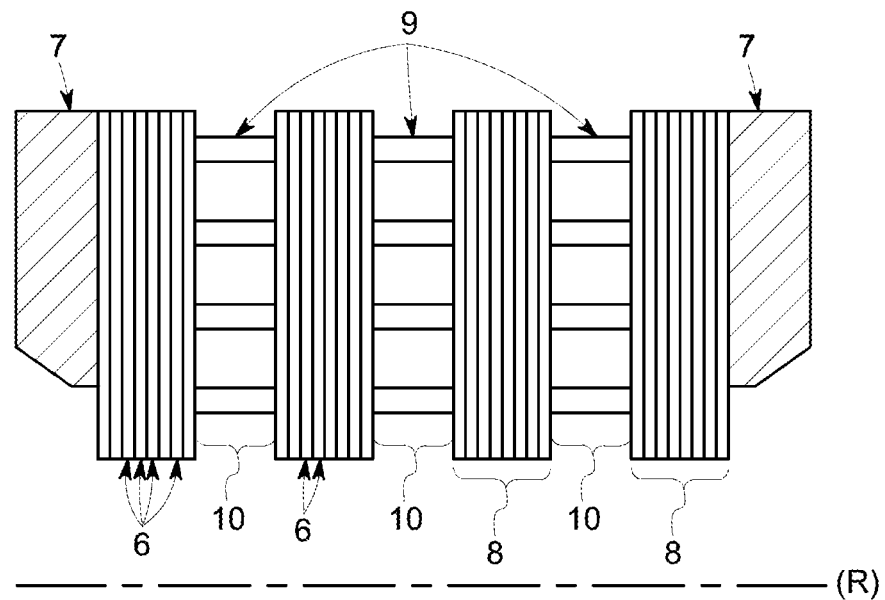
FIG. 3 illustrates an embodiment of a stator of a rotating electrical machine.

Reference is made to FIG. 3 which illustrates an embodiment of a stator of a rotating electrical machine.

A stator of a rotating electrical machine comprises a cylindrical metallic structure, stacks of magnetic sheets 6, tie rods or bars (not shown). It further comprises electrical windings (not shown), which are intended to be connected to a control device (not shown).

The axis of rotation of the cylindrical metallic structure is represented by the axis (R).

The metallic structure comprises two clamping plates 7. The magnetic sheets 6 are compacted axially between the two clamping plates 7. The clamping plates 7 are interconnected by tie rods or bars, thus ensuring the compaction and rigidity of the stator or rotor.

The rotor of the rotating electrical machine is inserted in the center of the metallic structure such that the axis of rotation of the rotor coincides substantially with the axis (R).

The magnetic sheets 6 are grouped into bundles of sheets 8 separated from each other by pins 9 arranged between them. The space thus created forms an air-flow duct 10.

The cooling fluid flowing in the air-flow duct 10 may be a liquid, an oil, a gas, and more particularly air.

The rotor of a rotating electrical machine comprising a shaft has a design similar to that of a stator. The rotor magnetic sheets are circular in shape, grouped into bundles of sheets separated by pins 9 and held by tie rods or bars, or by the rotor shaft itself.

Figure 4:
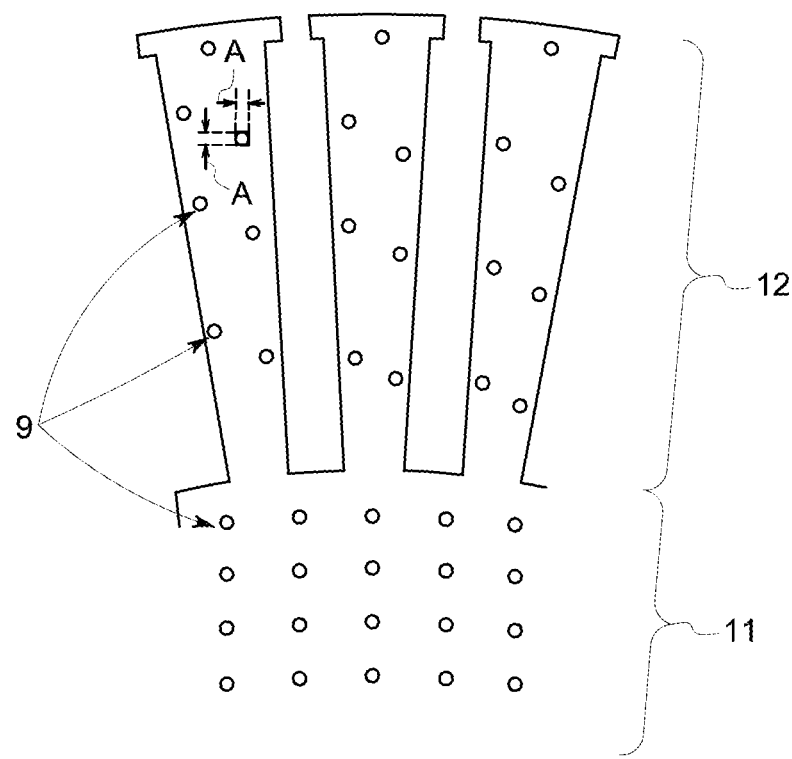
FIG. 4 illustrates an embodiment of a portion of a rotor magnetic sheet.

Reference is made to FIG. 4 which illustrates a portion of a rotor magnetic sheet comprising the pins 9.

The magnetic sheet has a yoke 11 and teeth 12. The yoke 11 is located on the periphery of the sheet and extends as far as the teeth 12, which are located on the outer periphery of the sheet. The teeth 12 form notches intended to accommodate the rotor windings.

The pins 9 are distributed over the entire surface of the magnetic sheet.

The pins 9 are fixed to the magnetic sheet by bluing, brazing, welding, molding or obtained by stamping. They are more particularly welded to the magnetic sheet.

The pins 9 in an embodiment all have the same section, but they may also have different sections. They can have a triangular, square or hexagonal section. They more particularly have a round section.

They are in an embodiment all of the same shape, but they can have different shapes. They can be in the form of a cylinder, a cone, a barrel or a diabolo. They are more particularly cylindrical in shape.

The pins 9 are made of metallic material, more particularly steel.

The section of the pins 9 is included in a square with an edge A of 1 to 10 mm, more particularly with an edge of 3 mm. Their length is between 2 and 20 mm, more particularly between 5 and 10 mm, and more particularly equal to 5 mm.

Figure 5:
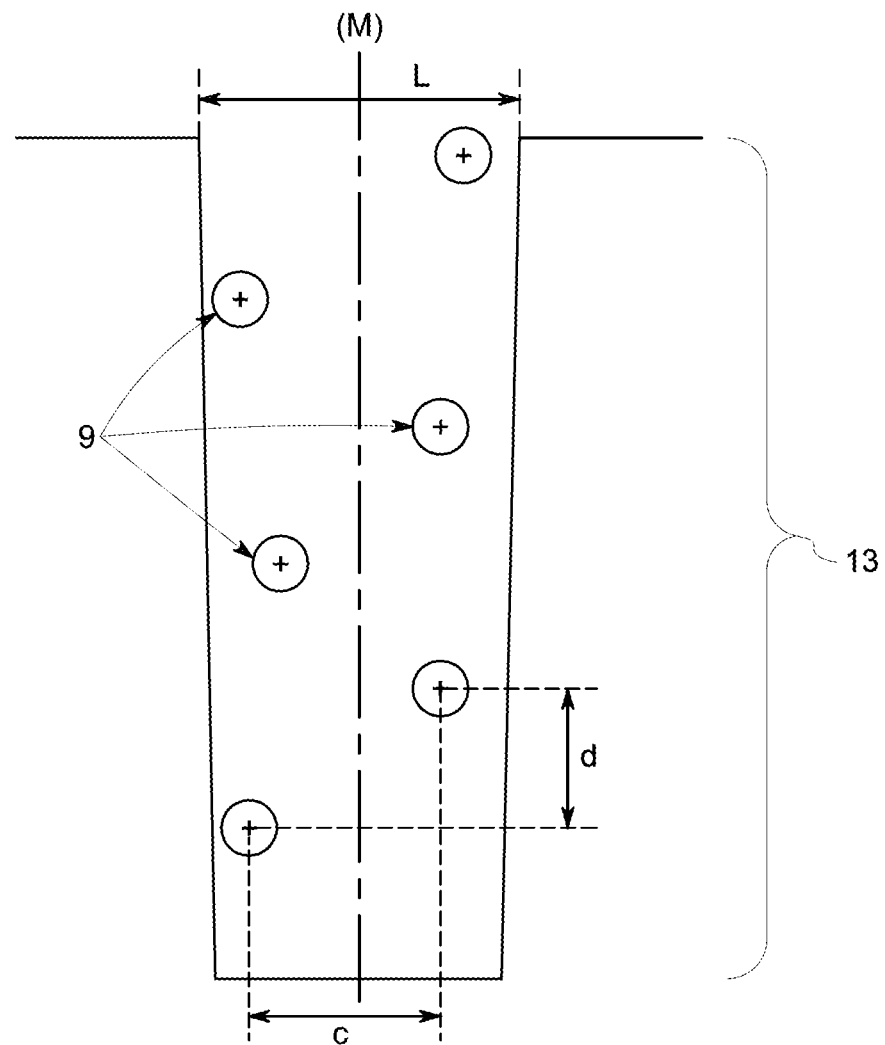
FIG. 5 illustrates an embodiment of a tooth of a stator magnetic sheet.

Reference is made to FIG. 5 which illustrates a tooth 13 of average width L of a stator magnetic sheet. It is not beyond the scope of the embodiments of the invention for the teeth of the rotor magnetic sheets to comprise pins arranged in the same way as those of the teeth of the stator sheets as described below.

The tooth 13 comprises a median axis (M) of width L of the tooth and with a radial direction.

The tooth 13 comprises the pins 9 which are asymmetrically distributed on the tooth 13 of the magnetic sheet relative to the median axis (M) of the tooth. The pins 9 are spaced at a sufficient distance from the edges of the tooth such that they can be fixed to the tooth by the chosen method.

The pins 9 are distributed such that the circumferential distance c between the centers of two adjacent pins 9 projected along an axis defined by the width L of the tooth is between $4/10$ and $8/10$, more particularly between $1/2$ and $6/10$ of the width L of the tooth, and that the radial distance d between the centers of two adjacent pins is between $1/10$ and $3/2$, more particularly between $1/3$ and $9/10$ of the circumferential distance c between the centers of two adjacent pins projected along an axis defined by the width L of the tooth.

The distances c and d may be different for each pair of adjacent pins 9.

Areas of turbulence appear in the vicinity of a pin.

The arrangement of the pins according to the embodiments of the invention creates additional zones of turbulence, since the arrangement of the pins is asymmetrical on the tooth relative to the arrangement of the pins known from the state of the art.

These zones of additional turbulence improve the heat exchanges. The heat exchange coefficient between the flow of cooling fluid, more particularly air, and the stator windings and/or the rotor windings arranged in the notches formed by two teeth is thus improved.

The temperature of the windings is reduced by 3 to 6° C. depending on the size, the power of the rotating electrical machine and the flow rate of the cooling fluid, more particularly air, in the cooling ducts. The heating of the windings is reduced by 2 to 5% depending on the case. Similarly, at an identical temperature of the windings, the power delivered by the rotating electrical machine is increased by 2 to 5%.

The written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. Element of a rotating electrical machine, of the rotor or stator type, comprising a plurality of stacks of magnetic sheets, each having a tooth comprising notches intended to accommodate electrical windings, and pins arranged between two successive bundles of sheets forming an air-flow duct, characterized in that a portion of the pins is distributed asymmetrically on the tooth of the stator or rotor sheet with respect to a median axis of the width of the tooth,
   whereby for the portion of asymmetrically distributed pins, the circumferential distance c between the centers of each of two adjacent pins projected along the median axis is between $4/10$ and $8/10$ of the width of the tooth L and the radial distance d between the centers of two adjacent pins is between $1/10$ and $3/2$ of the circumferential distance c between the centers of two adjacent pins projected along the median axis.

2. The element of a rotating electrical machine according to claim 1, constituting a rotor of the rotating electrical machine.

3. The element of a rotating electrical machine according to claim 1, constituting a stator of the rotating electrical machine.

4. The element of a rotating electrical machine according to claim 1, whereby the circumferential distance c between the centers of two adjacent pins is between $1/2$ and $6/10$ of the width of the tooth L.

5. The element of a rotating electrical machine according to claim 4, whereby the radial distance between the centers of two adjacent pins is between $1/3$ and $6/10$ of the circumferential distance c.

6. The element of a rotating electrical machine according to claim 1, whereby a section of the pin is triangular, square, hexagonal, or round.

7. The element of a rotating electrical machine according to claim 1, whereby the pin is in the form of a cone, barrel, diabolo, or cylinder.

8. The element of a rotating electrical machine according to claim 1, whereby the pins are made of a metallic material.

9. The element of a rotating electrical machine according to claim 1, whereby each pin is fixed to the tooth by gluing, brazing, welding, molding, or obtained by stamping.

10. The element of a rotating electrical machine according to claim 1, whereby a section of the pin is in a square with an edge of 1 to 10 mm.

11. The element of a rotating electrical machine according to claim 1, whereby the length of the pin is between 2 and 20 mm.

12. Rotating electrical machine comprising a rotor and a stator, whereby at least one of said rotor and stator comprises a plurality of stacks of magnetic sheets each having a tooth comprising notches intended to accommodate electrical windings, and pins arranged between two successive bundles of sheets forming an air-flow duct, characterized in that a portion of the pins is distributed asymmetrically on the tooth of the stator or rotor sheet with respect to a median axis of the width of the tooth,
   whereby for the portion of asymmetrically distributed pins, the circumferential distance c between the centers of each of two adjacent pins projected along the median axis is between $4/10$ and $8/10$ of the width of the tooth L and the radial distance d between the centers of two adjacent pins is between $1/10$ and $3/2$ of the circumferential distance c between the centers of two adjacent pins projected along the median axis.

13. The rotating electrical machine according to claim 12, whereby the circumferential distance between the centers of two adjacent pins $1/2$ and $6/10$ of the width of the tooth L.

14. The rotating electrical machine according to claim 13, whereby the radial distance between the centers of two adjacent pins is between $1/3$ and $6/10$ of the circumferential distance c.

15. The rotating electrical machine according to claim 12, whereby a section of the pin is triangular, square, hexagonal, or round.

16. The rotating electrical machine according to claim 12, whereby the pin is in the form of a cylinder, cone, barrel, or diabolo.

17. The rotating electrical machine according to claim 12, whereby the pins are made of a metallic material.

18. The rotating electrical machine according to claim 12, whereby each pin is fixed to the tooth by gluing, brazing, welding, molding, or obtained by stamping.

19. The rotating electrical machine according to claim 12, whereby a section of the pin is in a square with an edge of 1 to 10 mm.

20. The rotating electrical machine according to claim 12, whereby the length of the pin is between 2 and 20 mm.

* * * * *